B. F. BREWSTER.
MACHINE FOR ASSORTING, STACKING, AND COUNTING COINS.
APPLICATION FILED JUNE 9, 1908.
918,273.
Patented Apr. 13, 1909.
8 SHEETS—SHEET 1.
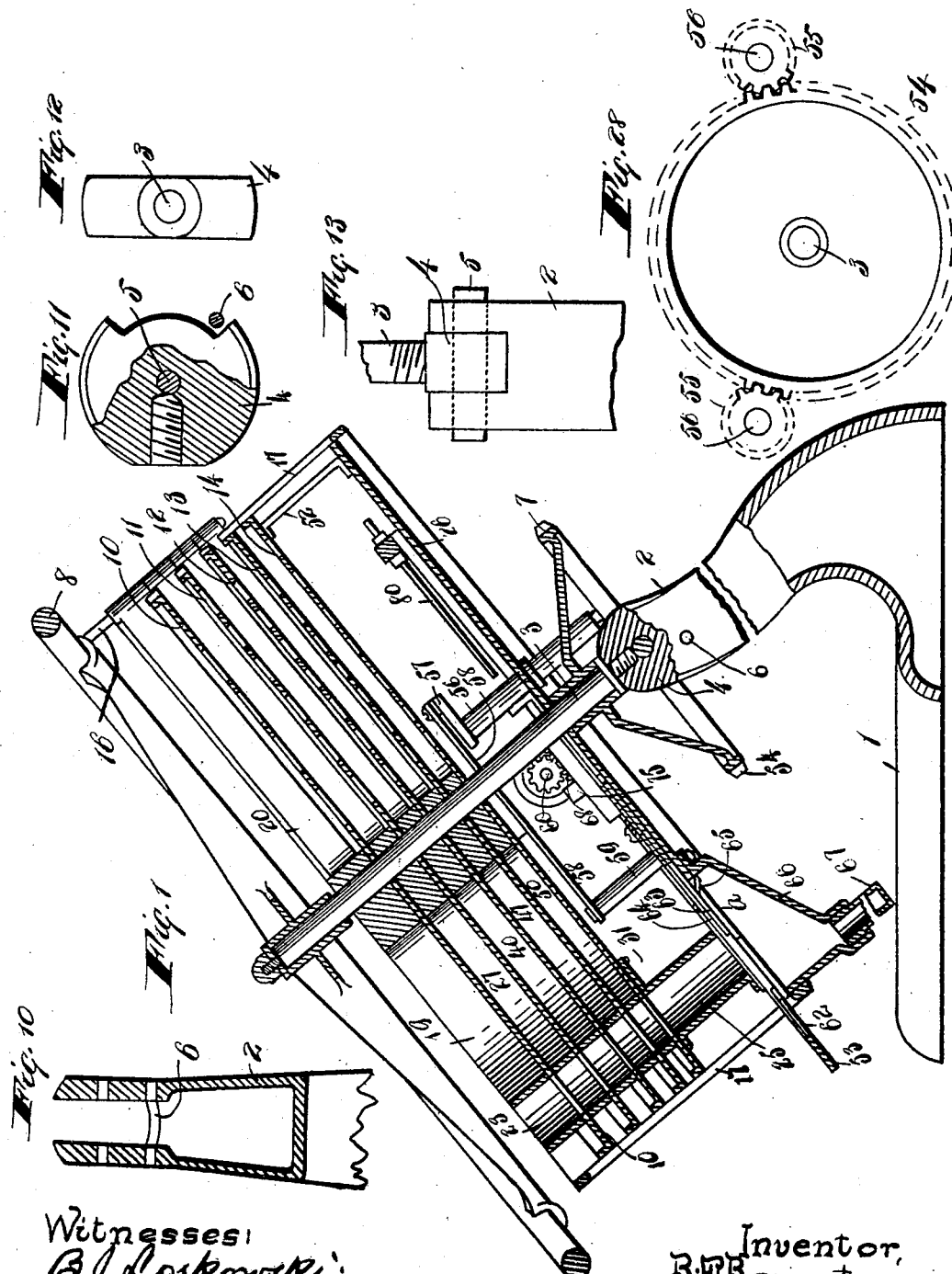
Witnesses:
B. J. Rotkowski
H. V. Stett
Inventor,
B. F. Brewster,
By A. L. Jackson,
Attorney

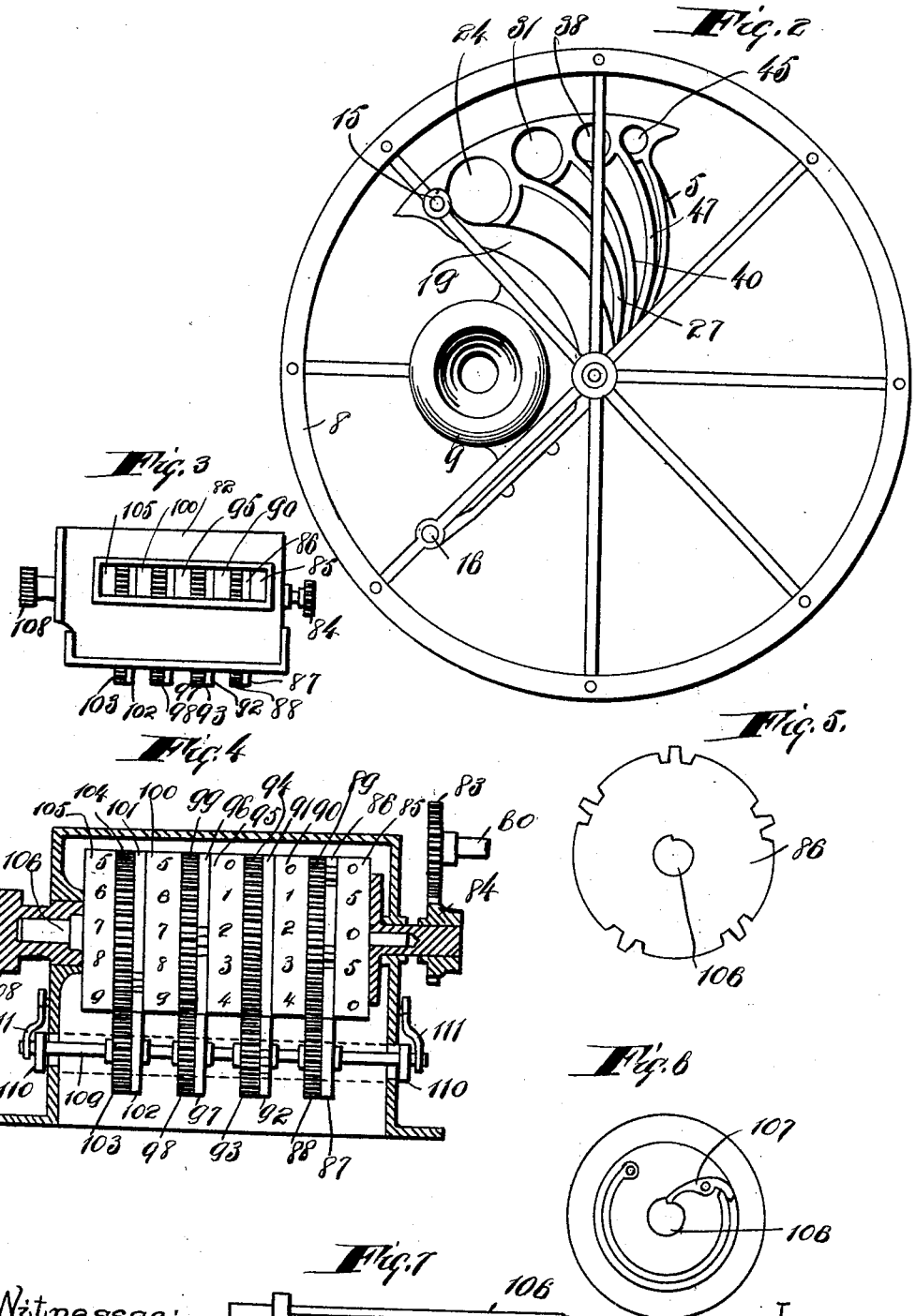

B. F. BREWSTER.
MACHINE FOR ASSORTING, STACKING, AND COUNTING COINS.
APPLICATION FILED JUNE 9, 1908.

918,273.

Patented Apr. 13, 1909.
8 SHEETS—SHEET 3.

Witnesses:
B. J. Koskowski
J. W. Stitt

Inventor,
B. F. Brewster,
By A. D. Jackson,
Attorney

B. F. BREWSTER.
MACHINE FOR ASSORTING, STACKING, AND COUNTING COINS.
APPLICATION FILED JUNE 9, 1908.
918,273.
Patented Apr. 13, 1909.
8 SHEETS—SHEET 4.
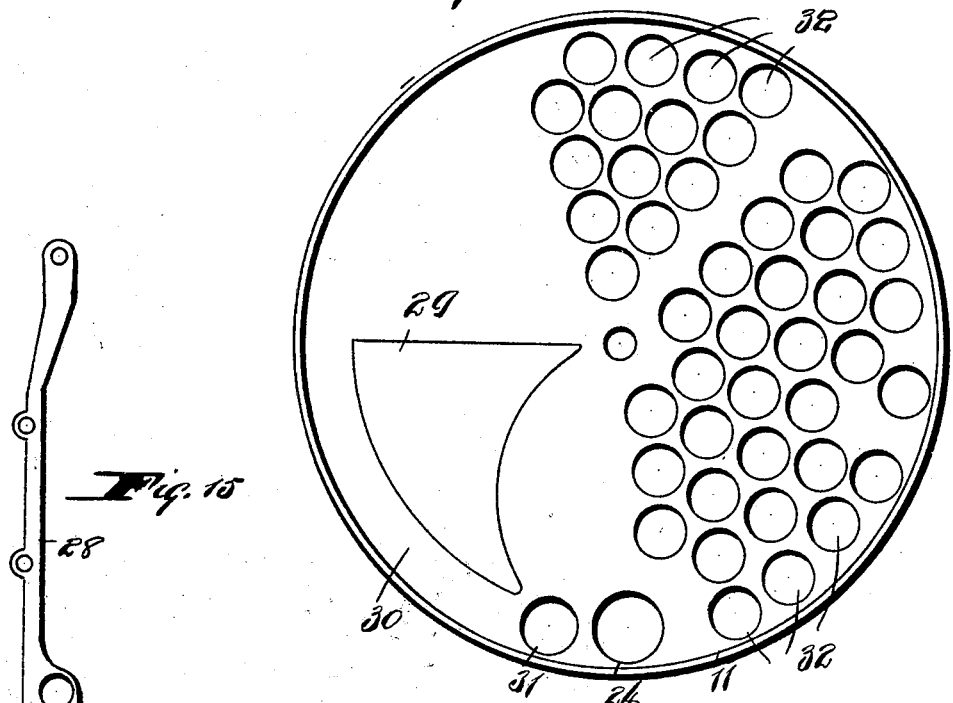
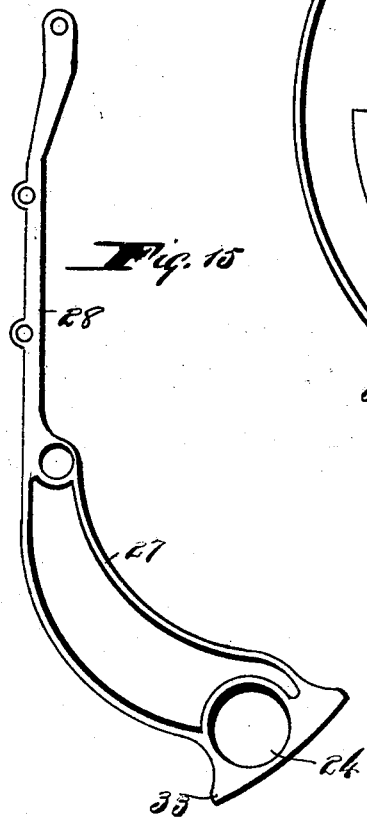
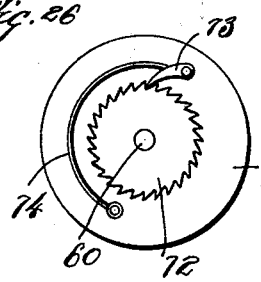
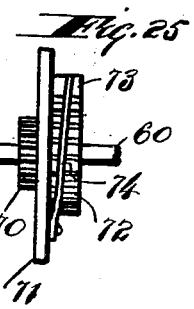
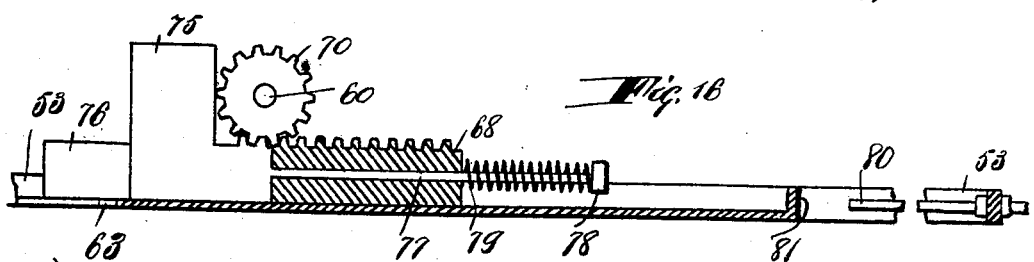
Witnesses:
B. J. Loskowski
J. W. Stitt
Inventor,
B. F. Brewster,
By A. L. Jackson,
Attorney.

B. F. BREWSTER.
MACHINE FOR ASSORTING, STACKING, AND COUNTING COINS.
APPLICATION FILED JUNE 9, 1908.
918,273.
Patented Apr. 13, 1909.
8 SHEETS—SHEET 5.
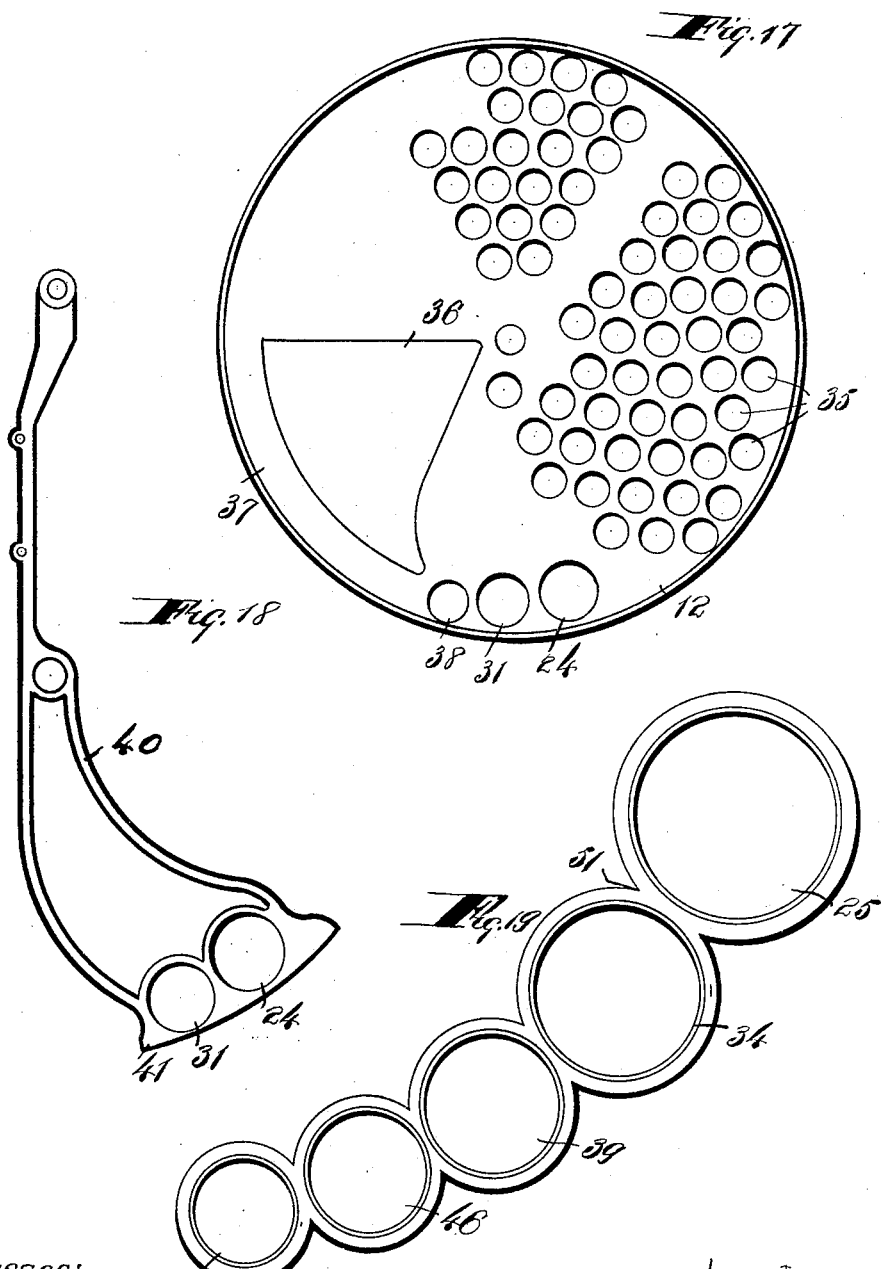

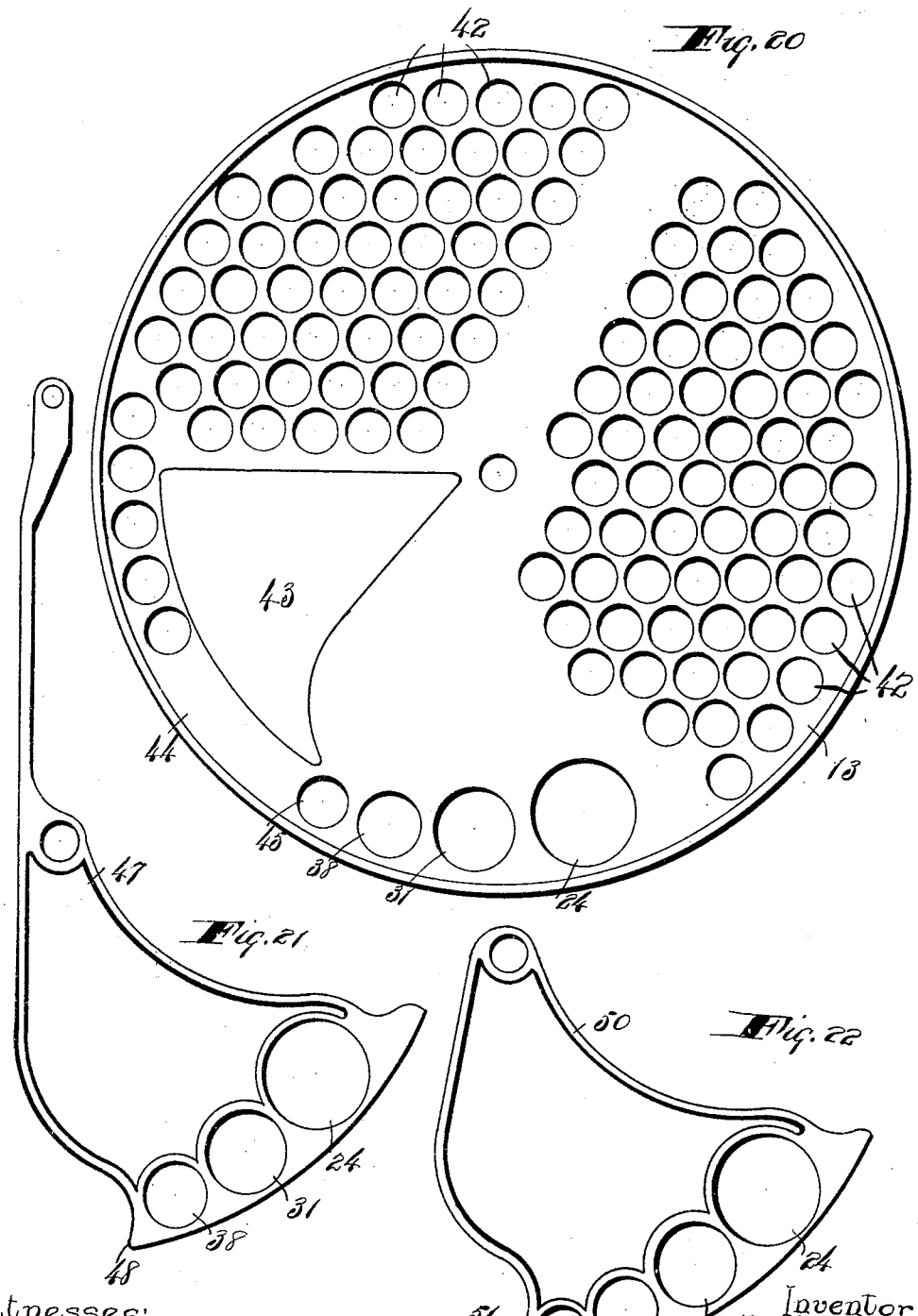

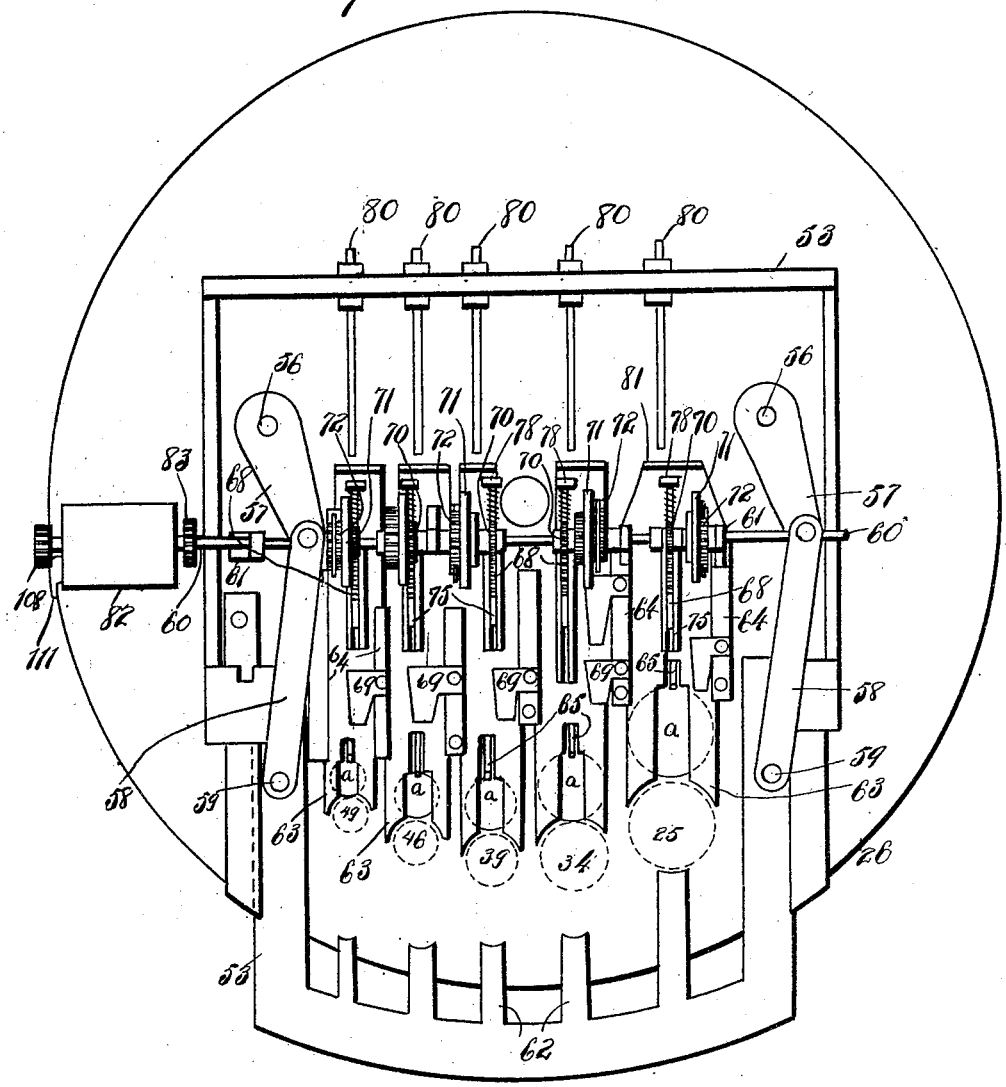

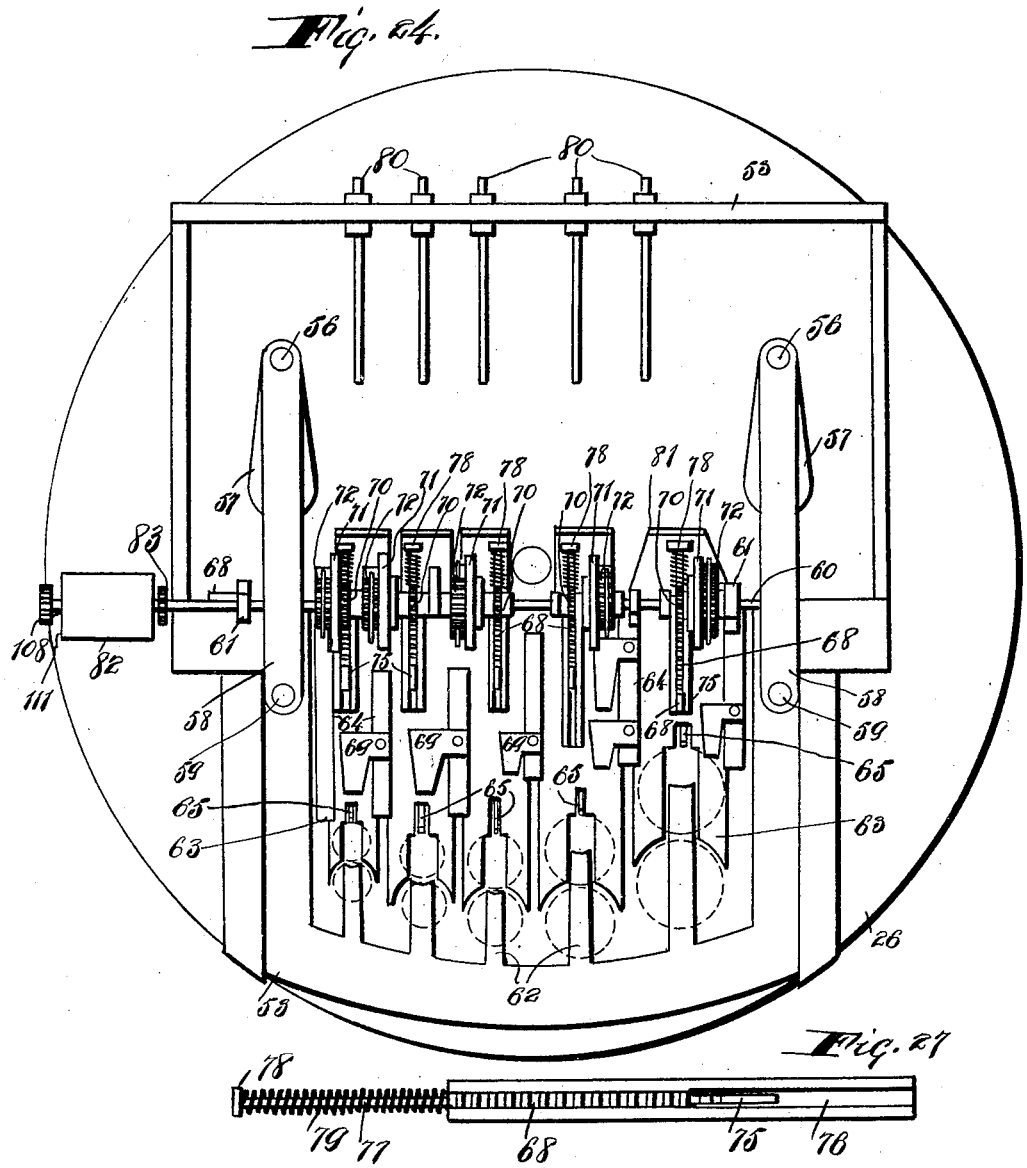

UNITED STATES PATENT OFFICE.

BERTRAM FORREST BREWSTER, OF BURRTON, KANSAS, ASSIGNOR OF TWO-THIRDS TO WALTER SCOTT WILSON, OF FORT WORTH, TEXAS.

MACHINE FOR ASSORTING, STACKING, AND COUNTING COINS.

No. 918,273.  Specification of Letters Patent.  Patented April 13, 1909.

Application filed June 9, 1908. Serial No. 437,487.

*To all whom it may concern:*

Be it known that I, BERTRAM F. BREWSTER, a citizen of the United States, residing at Burrton, county of Harvey, State of Kansas, have invented certain new and useful Improvements in Machines for Assorting, Stacking, and Counting Coins, of which the following is a specification.

This invention relates to machines for handling coins for the purpose of assorting and stacking and counting money which consists of coins of the several known denominations, and the object is to provide a machine which will receive a mixture of coins of various denominations, separate the coins according to denomination, stack each denomination in separate stacks, and count all the coins, giving the total value of all the coins. The advantage of this invention is the time saved in counting coins of various denominations. Instead of counting coins piece by piece, as is the custom, the mixture of coins is poured into the hopper of the machine and a handwheel, or other means for turning the machine, is set in motion. The coins are shifted by the machine and stacked and the accurate complete value of the coins is known in an incredibly short time.

Other objects and advantages will be fully explained in the following description and the invention will be particularly pointed out in the claims.

Reference is had to the accompanying drawings which form a part of this application and specification.

Figure 8:
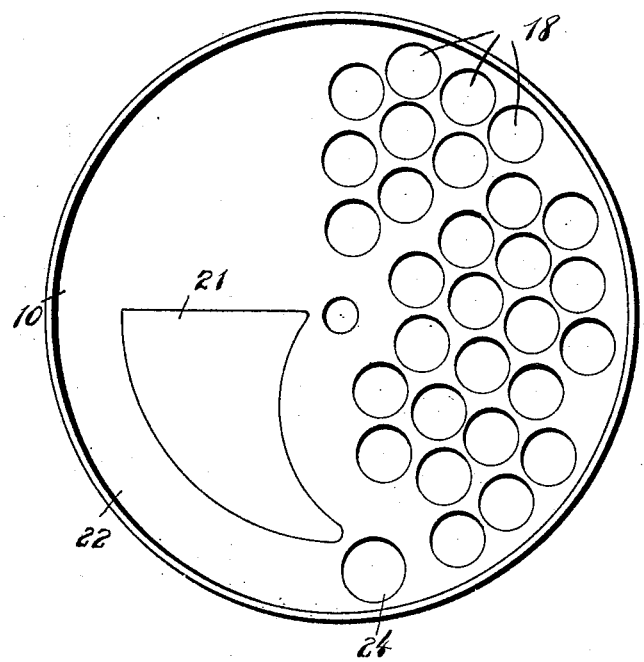
Figure 9:
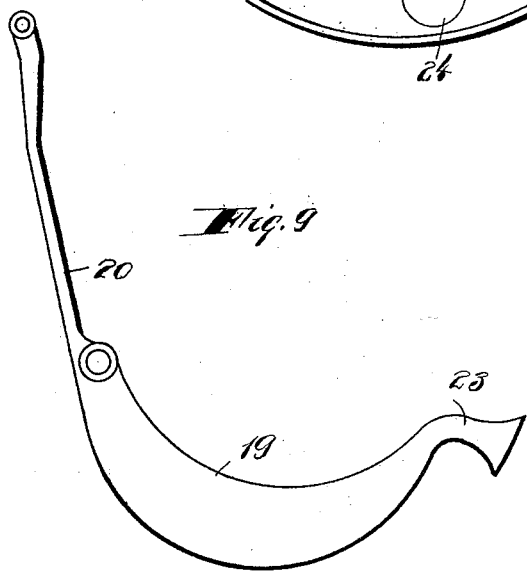

Figure 1 is a diametrical vertical section of the complete machine. Fig. 2 is a plan view, showing the hopper, the hand-wheel for turning the machine, and the guides which hold the coin-assorting disks apart and which guide the coins into their respective pockets, the disks being omitted from the view. Fig. 3 is a side elevation of the register. Fig. 4 is a vertical section of the register casing and the gearing within the casing. Fig. 5 is a side elevation of the first intermittent gearing which is attached to the first dial in the register. Fig. 6 is a detail view of a dial and the means for setting it back to zero. Fig. 7 is a detail view of the center shaft of the register. Fig. 8 is a plan view of the first or dollar disk which retains only the dollars when coins are passing through the machine. Fig. 9 is a plan view of the block which supports the hand-wheel and the hopper and which guides the dollars through the disk down to the counting plate. Fig. 10 is a broken sectional view of the connection of the machine with its base. Figs. 11, 12, and 13 are detail views of the connection of the machine with its base. Fig. 14 is a plan view of the half dollar disk. Fig. 15 is a plan view of the block which supports the dollar disk and guides the half dollars through the half dollar disk. Fig. 16 is a vertical section of one of the racks which operate the register and its coöperating lock, there being a lock coöperating with each rack. Fig. 17 is a plan view of the quarter dollar disk. Fig. 18 is a plan view of the block which supports the half dollar disk and which guides the quarter dollars to the counting plate. Fig. 19 is a plan view of a casting which forms a guide between the last (the dime disk) and the counting plate, there being a space between the dime disk and the counting plate, and the casting having a chute for each denomination of coins. Fig. 20 is a plan view of the nickel disk. Fig. 21 is a plan view of the block which supports the quarter dollar disk and guides the nickels to the counting plate. Fig. 22 is a plan view of the block which supports the nickel disk and guides the dimes to the counting plate. Fig. 23 is a plan view of the counting plate on which all the coins are received after they have been assorted, showing the mechanism for shifting the coins through the counting plate and recording the value of each and all coins as they pass through the plate, this view showing the plungers in their approximately normal positions ready to receive coins. Fig. 24 is a similar view, showing the position of the plungers after they have shoved the coins through the counting plate and registered the coins. Fig. 25 is a detail view of the plunger-actuated pinions and racks. Fig. 26 is a face view of the ratchet and disk shown in Fig. 25. Fig. 27 is a detail plan view of the pinion and its lock and the guide for the lock. Fig. 28 is a plan view of the driving gear.

Similar characters of reference are used to indicate the same parts throughout the several views.

The machine is provided with a base 1 having an upwardly-extending standard 2. A spindle 3 is mounted in the upper end of the standard 2 by screwing the same into a pivot bearing or socket 4 which is pivotally mounted in the standard by a pivot bolt 5 which may be tapered for convenience in driving the same back and forth. The rocking bearing 4 has a cut-out in the lower side, as shown in Fig. 11, and a pin 6 is inserted in the standard 2 and runs through the cut-out in block 4 to limit the rocking movement of the block. The machine revolves about the spindle 3. A gear wheel 7 is rigid with the spindle 3 and the plunger bars hereinafter set forth are driven from the wheel 7. A hand-wheel 8 is mounted on the spindle 3 and a hopper 9 is rigid with the hand-wheel 8. The hand-wheel is merely for turning the machine. Any suitable gearing may be used for this purpose. Coin - separating disks 10, 11, 12, 13, and 14 are mounted on the spindle 3 and the disks are made rigid with the hand-wheel 8 by means of bolts 15 which extend downwardly and through the coin assorting disks and supporting blocks. The machine is provided with an inclosing casing 17 which surrounds the machine or surrounds the operating mechanism. The arms of the supporting blocks extend out of the casing and are held in operative relation by bolts 16.

The coins are fed from the hopper and fall on the dollar disk 10. The disk 10 has enough apertures 18 large enough for half dollars but too small for dollars to pass through. A block 19 is mounted on the spindle 3 on top of the dollar disk 10. This block has one arm 20 which is cut away under the bottom to form a space between the disk and the arm 20 approximately the depth of a dollar so that dollars will pass under the arm. The arm will brush off any other coins that may be lying on top of the dollars. The disk 10 has a boss 21 or raised portion 21 to form a guide for the dollars which are moving on the disk. This boss 21 forms a passage way or track 22 for the dollars so that only one dollar can pass in the track at one time. This is done to prevent the dollars from binding. Other dollars might pass over the top of the boss 21 but they would not bind as the dollar passing in the track 22 would be free and would keep moving and this would prevent the dollars above the track from binding. The block 19 has a finger 23 which will guide the dollars to the aperture 24 so that each dollar will drop through all the disks and blocks to the receiver 25 which retains the dollars above the counting plate 26.

The half dollar disk 11 is mounted on the spindle 3 and is separated from the disk 10 by a block 27. All coins below the denomination of a dollar fall on the half dollar disk and all coins below the denomination of a half dollar fall on through the half dollar disk. The block 27 has an arm 28 similar to arm 20 for permitting half dollars to pass thereunder, the passage between the arm 28 and the disk 11 being of sufficient depth only to permit a half dollar to pass thereunder so that any coin that may be on top of a half dollar will be brushed off by the arm 27. The disk 11 has a boss or raised portion 29 which forms a track 30 for the passage of half dollars one at the time. The disk 11 has an aperture 24 for the passage of dollars and an aperture 31 for the passage of half dollars and a plurality of apertures 32 for the passage of all coins below a half dollar. The half dollars are guided to the aperture 31 by a finger 33 and fall through the aperture 31. The half dollars fall on through each disk and each block to the receiver 34 between the dime disk and the counting plate 26.

The quarter dollar disk 12 is similar to the disks previously described, having apertures 35 for the passage of all coins below a quarter of a dollar denomination, a boss or raised portion 36, a track 37, and an aperture 38 for the passage of quarter dollars through which the quarter dollars pass to the receiver 39. The quarter dollar disks have passages 24 and 31 for dollars and half dollars respectively. The block 40 is similar to the blocks previously described and performs similar functions, guiding the quarter dollars through the disk 12 by means of a finger 41. This block 40 has passages 24 and 31 for the dollars and half dollars respectively.

The nickel disk 13 is similar to the disks previously described. This disk has apertures 42 for the passage of all coins smaller than a nickel, a boss or raised portion 43, a track 44, and an aperture 45 for the passage of nickels to the receiver 46. The nickel disk has also apertures 24, 31, and 38 for the dollars, half dollars, and quarter dollars respectively. The block 47 is similar to the blocks previously described, having a finger 48 for guiding nickels through the aperture 45. This block has apertures 24, 31, and 38 for the passage of dollars, half dollars, and quarter dollars respectively. It will be understood that all the coin assorting disks and the blocks which coöperate with the disks are mounted on the spindle 3.

The last disk shown is the dime disk 14. This disk is a plain disk, having an aperture for the passage of dimes therethrough to the receiver 49. These disks may be increased or diminished in number without departing from my invention. The block 50 has a finger 51 for guiding dimes through the dime disk 14 and has apertures 24, 31, 38, and 45 for the passage of dollars, half dollars, quarter dollars, and nickels respectively. The edges of the disks are turned to form upwardly projecting flanges which serve to guide the coins so that the coins will not come in contact with the casing.

The coins are all assorted as they pass through the disks above described. The disks are set at an incline so that the coins will be shifted on the disks as the machine is rotated. The aperture in each disk is moving up an incline toward the coins when the coins slide on the disk and fall through the aperture. The blocks 27, 40, 47, and 50 space the disks apart and hold the same at the proper distance apart and the apertures through the blocks form guide ways for the coins. The coins pass into a receiver 51 which is attached to the dime disk 14 and to the counting plate 26 by suitable rivets. This receiver has coin chutes therein in which the coins may be stacked. These chutes are indicated by the numerals 25, 34, 39, 46, and 49 which numerals also indicate the positions of the chutes on the counting plate 26. The plate 26 may be further connected to the disk 14 by pillars 52. Thus all the coin assorting disks and their spacing and guiding blocks and the plate 26 are rigid with each other and turn on the spindle 3.

The counting and registering are accomplished on the plate 26. The coins in the receiver 51 form columns which rest on the plate 26 and occupy the spaces indicated by the dotted circles indicated by the numerals 25, 34, 39, 46, and 49. A reciprocating frame 53 is provided for shifting the coins through the plate 26 and the frame 53, and, when being driven or reciprocated, actuates gearing which operates a register to count the coins as they are dropped through the plate 26, the register indicating the total amount of all coins. The frame 53 is reciprocated by a cog wheel 54 which is rigid with the spindle 3 and by pinions 55 which are mounted on the vertical shafts 56. When the machine is revolved about the spindle 3, the pinions 55 are driven by the cog wheel 54. Crank arms 57 are rigid with the shafts 56. Links or pitmen 58 are pivotally connected with the cranks 57 and the links 58 are pivotally connected to the frame 53 by means of posts 59. A driven shaft 60 is journaled in bearings 61 which are attached to the plate 26. The frame 53 carries a series of plungers 62 which shift the coins through the plate 26. These plungers engage the bottom coin of each column of coins whenever the frame 53 is reciprocated to make a stroke. The coins occupy the place of the dotted circles on plate 26. A series of slides 63 are mounted on the plate 26 and held against displacement by suitable guides 64. The slides 63 correspond in number with the plungers 62 and are in alinement with the plungers. At the beginning of an operation the plungers 62 and the slides 63 occupy the positions shown in Fig. 23. The plungers 62 actuate the slides 63 by means of coins which are lying on the plate 26 between the plungers and the slides. When the frame 53 makes a stroke the plunger 62 will press against a coin and the coin will engage a slide 63 and shove the slide along on the plate 26 until the coin is tripped and made to fall through its aperture in the plate 26. A series of apertures $a$ are formed in the plate 26 for the passage of coins. These passages correspond in number to the plungers and the slides and to the number of the kinds of coins to be counted. The coins are tripped by springs 65 which are attached to the underside of the plate 26 and project up through slots in the plate 26. The trips or springs 65 are positioned to trip the coins at predetermined periods of time hereinafter explained. The coins fall through the plate 26 into suitable chutes 66 and receivers 67.

The slides 63 have racks 68 rigid therewith and consequently the racks 68 are driven as the slides 63 are driven. Tension springs 69 are attached to the guides 64 to press on the slides 63 to prevent displacement of these slides when the disks and the plate are turning, the plate being at an incline for portions of the distance of a revolution. The slides may be loose under the guides 64, but the springs 69 will press on the slides sufficiently to prevent the slides from moving by gravity. The racks 68, when actuated, drive pinions 70 which are loose on the shaft 60. A disk 71 is rigid with the pinion 70 and loose on the shaft 60. A ratchet wheel 72 is rigid with the shaft 60. The disk 71 carries a pawl 73 and a spring 74 which holds the pawl 73 in engagement with the ratchet wheel 72. By means of the disk 71 and the pawl 73, the pinion 70 drives the ratchet wheel 72 and the shaft 60. It will be understood that a pinion 70, disk 71 with its pawl 73, and ratchet 72 are used with each rack 68. A plunger 62 presses a coin against the end of a slide 63 which drives the rack 68 and the rack 68 drives the pinion 70 and the ratchet 72 and the shaft 60. When the plunger 62 is retracted, the pinion 70 and disk 71 simply turn on the shaft 60. Every forward turn of the shaft 60 counts in the register hereinafter described. A dollar causes the greatest turn of the shaft 60 because the dollar causes the greatest movement of the rack 68. A dime will cause the least turning of the shaft 60. The pinion 70 for the dollar has ten teeth and the rack has ten teeth so that the shaft 60 will make a complete revolution. The pinion for the half-dollar has twelve teeth and the rack has six teeth so that the shaft 60 will make one half revolution. The pinion 70 for the quarter dollar pieces has twelve teeth and the rack has three teeth so that the shaft 60 will make only one-fourth of a revolution. The pinion 70 for the nickel has twenty teeth on the pinion and one tooth on the rack and the shaft 60 is turned only one-twentieth of a revolution. The pinion 70 for the dime has twenty teeth and the rack has two teeth so that the shaft 60 will turn one-tenth of a revolution when a dime is being registered. It will be understood that the teeth on the pinions and racks may be varied.

The reciprocation of the frame 53 will operate any one or all or any combination of the pinions 70. If a coin is lying in each place in the drawings, the dollar will drive the pinion 70 one revolution; on a further forward drive of the frame, the half dollar will cause the shaft 60 to turn one half revolution; on a further forward drive of the frame, the quarter dollar will cause the shaft 60 to turn one fourth of a revolution; on a further forward drive of the frame, the nickel will cause the shaft 60 to turn one-twentieth of a revolution; on a further forward drive of the frame, the dime will cause the shaft 60 to turn one-tenth of a revolution. If, when the frame 53 is driven forward, there is no coin in the path of any plunger, the pinion corresponding to that vacant coin space will not be turned because there is nothing to move the slide. The shaft 60 will be turned only when there is a coin in the path of a plunger. If there is no coin in the path of the plunger, the plunger will simply project in the slot in the slide without moving the slide. There are two reasons for mounting the pinions 70 loosely on the shaft 60. One reason is that the racks 68 may go back to starting point without affecting the shaft 60, and another reason is to permit the shaft 60 to turn in the pinions after the pinions are locked as hereinafter explained.

Provision is made for locking the pinions or locking each pinion after it has performed its function in one drive of the reciprocating frame. For instance, supposing a coin is lying in the path of each plunger and a drive of the reciprocating frame is made, the dollar will cause one revolution of the shaft 60. The pinion corresponding to the dollar is locked as soon as the revolution is completed. The half dollar will then cause a half revolution of the shaft 60. The pinion 70 corresponding to the half dollar will be locked as soon as the half revolution is completed, and so on until all the pinions 70 have performed their functions. No two pinions are operating at the same time. The pinion corresponding to the quarter dollar does not commence to turn until the pinion corresponding to the half dollar has completed its function. The locking means for accomplishing this feature of the invention consists of a lock co-operating with each rack and pinion. The lock 75 forms a continuation of the rack 68, having one or more teeth similar to the teeth of the rack 68. The rack 68 has a slotted body portion 76 in which the lock 75 reciprocates. A rod 77 is rigid with the lock and the body portion of the rack 68 has a perforation through which the rod 77 projects. A head 78 is made rigid on the end of the rod 77 and a spiral spring 79 is mounted on the rod 77 between the head 78 and the rack 68. The object of the spring is to hold the rack and the lock flush with each other so that the pinion 70 will always mesh with the rack and the lock, and yet permit the rack 68 to travel on beyond the pinion 70. When the rack 68 starts back to starting point the spring 79 will cause the rack to mesh with the pinion 70. It will be understood that when the rack 68 goes back under the pinion 70 the pawl 73 passes over the teeth of the ratchet 72 without turning said ratchet. The frame 53 is provided with a series of adjustable rods 80 which are used to shove the slides 63 back to their normal positions when the frame 53 is going back to starting point. These rods 80 strike the turned up portions 81 of the slides 63.

The shaft 60 operates the register 82. A gear wheel 83 is mounted on the shaft 60 and meshes with a gear wheel 84 which is rigid with the first dial 85 of the register. The intermittent gear wheel 86 meshes with and drives the intermittent pinion 87 which is rigid with the pinion 88. The pinion 88 drives the cog wheel 89. One revolution of the first dial 85 and intermittent gear 86 will cause the second dial 90 to turn one-half revolution, the second dial 90 being rigid with the cog wheel 89. The second dial 90 is rigid with the intermittent gear wheel 91 which has one tooth. The intermittent gear wheel 91 meshes with an intermittent pinion 92 which is rigid with the pinion 93 by which the pinion 93 is driven. The pinion 93 drives the cog wheel 94. The cog wheel 94 is rigid with the third dial 95 and the intermittent gear wheel 96. Intermittent gear wheel 96 drives the intermittent pinion 97 which is rigid with the pinion 98. The pinion 98 drives the cog wheel 99 which is rigid with the fourth dial 100. Dial 100 is rigid with the intermittent gear wheel 101. Intermittent gear wheel 101 drives the intermittent pinion 102 which is rigid with the pinion 103. Pinion 103 drives the cog wheel 104 which is rigid with the dial 105. The dials are locked to the shaft 106 by means of a spring pressed pawl 107 which engages a slot in shaft 106. This is done only in setting the dials. The shaft 106 is turned by the milled head 108 and as the shaft is turned it will engage each pawl of each dial and bring all the dials to zero or starting point. Before commencing to set the dials, all the pinions in the register are thrown out of mesh with the cogs and intermittent gear wheels. This is done by the following described means: The shaft 109 of the pinions is mounted in a yoke 110 which has a vertical movement by reason of slots in the ends of the register casing. The yoke is moved by levers 111 which are fulcrumed on the ends of the register casing. The first dial is marked alternately with "0" and "5", five 5's and five 0's being used. The other dials are marked with the numerals from "0" to "9" inclusive.

A dollar will cause the counting plate shaft 60 to turn one revolution. This will cause the dial 85 to turn two revolutions, the dial 90 to turn one revolution, and the dial 95 to turn one-tenth of a revolution. This will bring the dial 95 to the unit "1" and the dials 85 and 90 to "0". This would indicate $1.00. A half dollar would turn shaft 60 one half revolution. Shaft 60 would turn the dial 85 one revolution and dial 85 would turn the dial 90 from "0" to "5". This would indicate $1.50. A quarter dollar would turn shaft 60 one fourth of a revolution. Shaft 60 would turn dial 85 one half revolution, or from "0" at the beginning to "5" at the half circumference. At the same time dial 85 will turn the dial 90 two-tenths, or from the "5" (already indicated) to "7". This would indicate $1.75. A nickel would turn the shaft 60 one-twentieth of a revolution. Shaft 60 would turn dial 85 one-tenth of a revolution, or from "5" to "0". At the same time dial 85 turns dial 90 one-tenth, or from "7" to "8". This would indicate $1.80. A dime would turn the shaft 60 one-tenth of a revolution. Shaft 60 would turn the dial 85 two-tenths of a revolution, or from "0" on beyond "5" to the next "0". At the same time dial 85 would turn dial 90 one-tenth, or from "8" to "9". This would indicate $1.90. In this manner the register will indicate the sum or total of all coins that may be passed through the machine.

The dial 85 is moved one-tenth by a nickel. If at the same time, dial 90 were standing at "0", the dial 90 would not be moved, but a second nickel would move dial 85 another tenth of a revolution and on this second revolution of dial 85, it would move dial 90 one-tenth of a revolution. In other words, it requires two one-tenth revolutions of dial 85 to move the dial 90 one one-tenth revolution. From the dial 90 the dials are geared to move ten revolutions to one revolution of the next succeeding dial. The intermittent gear wheel 86 which moves with dial 85 has five teeth. Each of the other intermittent gear wheels 91, 96, and 101 has only one tooth.

Having fully described my invention, what I claim as new and desire to secure by Letters Patent, is—

1. A counting machine having a register provided with an operating shaft projecting therefrom and a reciprocating frame having a plurality of operative connections with said shaft whereby said register will be operated one step or a plurality of steps in accordance with the presence and denomination of a single article or a plurality of articles respectively to be counted.

2. A counting machine having a register provided with an operating shaft projecting therefrom and a reciprocating frame having a plurality of operative connections with said shaft and actuated by said machine whereby said register will be operated one step or a plurality of steps in accordance with the presence and size of a single article or a plurality of articles respectively to be counted.

3. A counting machine having a register and a reciprocating frame having a plurality of operative connections with said register and actuated by said machine whereby said register will be operated one step or a plurality of steps, the number of steps operated being determined by the number and size of articles placed in said machine to be counted.

4. A counting machine having a register and a reciprocating frame having a plurality of operative connections with said register and actuated by said machine whereby said register will be operated one step or a plurality of steps, the number of steps operated being determined by the number of articles and the size of the articles placed in said machine to be counted.

5. A counting machine having a register provided with an operating shaft, a plurality of actuating elements operatively connected with said shaft and a reciprocating frame actuated by said machine for driving said elements whereby said register will be moved one step or a plurality of steps, the number of steps moved being determined by the number and size of articles placed in said machine to be counted.

6. A coin counting machine having means for sorting a mass of coins of various denominations, means for shifting each class of coins into stacks, a reciprocating frame provided with a series of plungers for shifting the coins from the stacks into receivers, means for registering the value of the first coin, adding thereto the value of each coin and indicating the total value of all coins simultaneously with the shifting of the coins from the stacks into the receivers, means operatively connected with the adding and indicating means to be actuated by said frame.

7. A coin counting machine having means for sorting a mass of coins of various denominations, means for stacking the coins when separated, means for rotating the machine to cause the sorting and stacking of the coins, a reciprocating frame having a series of graduated plungers actuated by the rotating means for shifting said coins from the stacks into separate receivers, means actuated by said shifting means for registering the value of the first coin, adding thereto the value of each coin and for indicating the value of the mass of coins, and graduated gearing actuated by said frame for operating the adding and indicating means.

8. A coin counting machine having a base, a spindle projecting at an incline from said base, a series of coin sorting disks mounted on said spindle, each disk except the last having a plurality of passages for unassorted coins and each disk having one or more passages for assorted coins and each disk having an upstanding flange, and spacing blocks between the disks having passages therethrough registering with the last mentioned passages of said disks.

9. A coin counting machine having a base, a spindle projecting at an incline from said base, a series of coin sorting disks mounted on said spindle, each disk except the last having a plurality of passages for unassorted coins and each disk having one or more passages for assorted coins and each disk having an upstanding flange and a raised portion coöperating with said flange to form a track for assorted coins leading to the coin passage from each disk, and spacing blocks between said disks having passages for assorted coins registering with the assorted coin passages of said disks.

10. A coin counting machine having a base, a spindle projecting from said base, a series of coin assorting disks mounted on said spindle and provided with apertures for the passage of coins, and spacing blocks mounted on said spindle between said disks and having arms coöperating with said disks to sort coins and to guide coins through said disks.

11. A coin counting machine having a base, a spindle projecting at an incline from said base, a series of coin assorting disks mounted on said spindle, each disk except the last having a plurality of apertures for the passage of unassorted coins and the first disk having a single aperture and the other disks having a plurality of apertures for the passage of assorted coins, and spacing blocks mounted on said spindle between said disks and carrying arms to coöperate with said disks to sort coins and carrying fingers to guide coins through the apertures in said disks for assorted coins.

12. A coin counting machine having a base, a spindle projecting at an incline from said base, a series of assorting disks mounted on said spindle, each disk except the last having a plurality of passages for the passage of unassorted coins and the first disk having a single aperture and each succeeding disk having a plurality of apertures for the passage of assorted coins, and spacing blocks mounted on said spindle and carrying arms cut away at the lower parts thereof to permit only assorted coins to pass thereunder and carrying fingers to guide coins through the assorted coin passages of said disks and having apertures therethrough registering with the assorted coin passages of said disks.

13. In a rotatable counting machine provided with a stationary spindle; a series of apertured coin assorting disks mounted on said spindle and spaced apart from each other and each disk having an upstanding flange to prevent the coins from coming in contact with the casing of the machine.

14. In a rotatable coin counting machine provided with a stationary spindle and a series of coin assorting disks mounted on said spindle; a receiver attached to the lowest disk, means coöperating with said disks to stack assorted coins in said receiver, and a counting plate mounted on said spindle and attached to said receiver and to said lowest disk and provided with means for registering the value of coins from said receiver.

15. In a rotatable coin counting machine provided with means for assorting and stacking coins; a counting plate attached to said machine, a reciprocating frame provided with plungers operating on said plate for taking coins from the stacks, and means coöperating with said plungers for registering the value of the first coin acted upon and adding to said value the value of each subsequent coin acted upon.

16. In a rotatable coin counting machine provided with means for assorting coins and arranging the same in stacks; a counting plate rotating with said machine, a frame reciprocating on said plate and carrying a series of plungers, and a graduated series of actuating devices coöperating with said plungers for registering the value of the first coin acted upon, adding to such value of each coin and for indicating the total value of all coins placed in the machine.

17. In a rotatable coin counting machine provided with means for assorting coins and arranging the same in stacks; a counting plate rigid with said machine, counting mechanism mounted on said plate, and a reciprocating frame actuated by the rotation of said machine and carrying a graduated series of plungers for operating said counting mechanism.

18. In a rotatable coin counting machine provided with a stationary spindle and spaced coin assorting disks rotating about said spindle; a counting plate attached to said disks and receiving assorted coins therefrom, counting mechanism mounted on said plate, a cog wheel rigid with said spindle, and gearing carried by said plate and driven by said cog wheel for operating said counting mechanism.

19. In a rotatable coin counting machine provided with a stationary spindle and spaced coin assorting disks rotating about said spindle; a counting plate attached to said disks and supporting stacks of coins thereon, means for shifting coins from said stacks through said counting plate, and means mounted on said plate for registering the value of each coin simultaneously with the shifting of the coin.

20. In a rotatable coin counting machine provided with a stationary spindle and spaced disks rotating about said spindle for assorting coins and means carried by said disks for stacking the coins as they are assorted; a counting plate attached to said disks and supporting the stacks of coins, counting mechanism carried by said counting plate, gearing for operating said counting mechanism, and means for shifting coins from said stacks through said counting plate and simultaneously actuating said gearing.

21. In a rotatable coin counting machine provided with a stationary spindle and spaced disks rotating about said spindle for assorting coins and carrying means for stacking coins as they are assorted; a counting plate attached to said disks and supporting the stacks of coins, a reciprocating frame mounted on said counting plate for shifting coins from said stacks through said plate, gearing for actuating said frame, and counting mechanism mounted on said plate and actuated by said reciprocating frame for registering the value of each coin and the total value of all the coins passing through said machine.

22. In a rotatable coin counting machine provided with a stationary spindle and spaced disks rotating about said spindle for assorting coins and carrying means for stacking coins as they are assorted; a counting plate moving with said disks and supporting the stacks of coins, a reciprocating frame mounted on said plate and carrying plungers for shifting coins from the stacks of coins through said plate, and means for registering the value of each coin as it is shifted through said plate and for indicating the total value of all coins passed through said machine.

23. In a machine for assorting and arranging coins in stacks provided with a stationary spindle; a counting plate rotating about said spindle, counting mechanism mounted on said plate, a reciprocating frame carrying plungers adapted to move coins from the stacks of coins and cause the same to actuate said counting mechanism, and means for reciprocating said frame.

24. In a coin counting and assorting machine provided with a stationary spindle; a counting plate rotating about said spindle and receiving stacks of coins thereon, a reciprocating frame mounted on said plate and carrying plungers adapted to move the bottom coins of the stacks of coins at each forward movement, and a counting mechanism mounted on said plate and adapted to be actuated by the coins being moved by said plungers to register the value of each coin and to indicate the total value of all the coins passed through the machine.

25. In a coin counting and assorting machine provided with a stationary spindle; a counting plate rotating about said spindle and receiving stacks of coins thereon, a counting mechanism to register the value of any and all coins passed through the machine, a reciprocating frame carrying plungers adapted to move the bottom coins from the stacks of coins and to actuate said counting mechanism by means of the coins being moved by the plungers, gearing for driving said frame, and a cog wheel rigid with said spindle for driving said gearing.

26. In a coin counting and assorting machine provided with a stationary spindle; a counting plate rotating about said spindle and receiving stacks of coins thereon, a receiver holding the stacks of coins in place on said plate, a counting mechanism, a series of plungers adapted to move the bottom coins from the stacks of coins and to actuate said counting mechanism by means of the coins being moved, and means for driving said plungers.

27. In a coin counting machine provided with a stationary spindle; a counting plate rotating about said spindle and receiving stacks of coins thereon, a receiver holding the stacks of coins in place on said plate, a counting mechanism, a reciprocating frame provided with plungers adapted to move the bottom coins from the stacks of coins and to actuate said counting mechanism by means of the coins being moved, and means for driving said frame consisting of a cog wheel rigid with said spindle and gearing operatively connected with said frame and driven by said cog wheel.

28. In a coin counting and assorting machine, a plate receiving stacks of assorted coins thereon and having a series of apertures therethrough corresponding in size to the size of the coins of different denominations, a counting mechanism, a frame reciprocating on said plate and carrying plungers adapted to move the bottom coins of the stacks of coins to actuate said counting mechanism, and means for tripping said coins through said apertures at the moment each coin is registered.

29. In a coin counting machine, a register and a series of graduated racks and pinions for actuating said register by means of coins, each pinion being provided with a ratchet wheel to lock the same during a driving operation.

30. In a coin counting machine, a register, a series of graduated racks and pinions for actuating said register, each pinion being provided with a ratchet wheel to lock the same during a driving operation, and means for driving said racks by means of coins to be registered.

31. In a coin counting machine, a register, a series of graduated racks and pinions for actuating said register, each pinion being provided with a ratchet wheel to lock the same during a driving operation, a series of coin-actuated slides carrying said racks, and means for driving coins against said slides.

32. In a coin counting machine provided with a stationary spindle; a counting plate rotating about said spindle, a register carried by said plate, and gearing including a reciprocating frame automatically actuated by the rotation of said plate for operating said register.

33. In a coin counting machine, a register, a series of graduated racks and pinions for operating said register, each pinion being provided with a ratchet wheel to lock the same during a driving operation, and a series of coin-actuated slides automatically actuated to drive said racks.

34. In a coin counting machine provided with a stationary spindle; a counting plate rotating about said spindle, a register, a series of graduated racks and pinions mounted on said plate for operating said register, a series of coin-actuated slides for driving said racks, and a reciprocating frame carried by said plate and provided with plungers for driving coins against said slides.

35. In a coin counting machine provided with a stationary spindle; a counting plate rotating about said spindle and provided with a series of graduated perforations, a reciprocating frame and a series of actuating devices coöperating therewith mounted on said plate for registering the value of the first coin, adding to such value the value of each subsequent coin, and for indicating the total value of all coins passed through the machine, and means for tripping the coins through said plate at the moment each coin is registered.

36. In a coin counting machine, a register, a series of graduated racks and pinions operatively connected with said register, and a reciprocating frame carrying plungers adapted for actuating said racks by a series of graduated coins.

37. In a coin counting machine, a counting plate, means for assorting and stacking the assorted coins on said plate in series, a register, a series of graduated racks and pinions operatively connected with said register, slides carrying said racks, and a series of plungers adapted to drive coins against said slides to actuate said racks.

38. In a coin counting machine, a counting mechanism, a driving shaft operatively connected with said counting mechanism, a series of pinions loosely mounted on said shaft, racks for driving said pinions, a series of ratchets and pawls for locking said pinions on said shaft for driving purposes, and coin-actuated slides for driving said racks.

39. In a coin counting machine, a counting mechanism, a driving shaft operatively connected with said counting mechanism, a series of pinions loosely mounted on said shaft, a series of separable racks for driving said pinions, a series of coin-actuated slides for driving said pinions, and means for locking said pinions to said shaft for driving in one direction.

40. In a coin counting machine, a counting mechanism, a series of graduated racks and pinions for actuating said counting mechanism, and a series of coin-actuated slides carrying said racks each rack having a separable locking portion whereby each pinion in succession from the pinion having the greatest rotation to the last pinion is locked against rotation after each pinion has performed its function.

41. In a counting machine, means for assorting coins and stacking the same in a graduated series, a counting mechanism, a shaft operatively connected with said counting mechanism, a series of graduated pinions mounted loosely on said shaft, a series of racks corresponding to said stacks of coins for driving said pinions, means for locking said pinions to said shaft for driving in one direction, and a reciprocating frame carrying plungers to drive said racks by means of coins, each rack having a separable locking portion to lock its coöperating pinion against rotation after it has performed its function whereby said frame continues its forward drive until each pinion in the series has performed its function.

42. In a coin counting machine, a counting mechanism, a shaft operatively connected with said counting mechanism, a graduated series of pinions loosely mounted on said shaft, means for locking said pinions to said shaft for driving in one direction, and racks for driving said pinions, each rack being provided with a separable locking portion for locking its coöperating pinion against rotation after the pinion has performed its function whereby the forward drive of all the racks continues until each rack causes its coöperating pinion to perform its function.

43. In a coin counting machine, a register for indicating the value of each coin and the total value of all coins passed through the machine and gearing for operating said register including driving racks and driven pinions, each rack having a separable locking portion for locking its coöperating pinion while the other part of the rack moves beyond the pinion.

44. In a coin counting machine, a register for indicating the value of each coin and the total value of all coins passed through the machine and gearing for operating said register including driving racks and driven pinions, each rack having a separable locking portion and means for holding the locking portion yieldingly toward the other portion.

45. In a coin counting machine, a register for indicating the value of each coin and the total value of all coins passed through the machine and gearing for operating said register including driving racks and driven pinions, each rack having a main portion and a separable locking portion, means for holding the locking portion and the main portion yieldingly toward each other, and means for guiding the two parts of said rack from and toward each other.

46. In a coin counting machine, a counting plate, a register for indicating the value of each and all coins, gearing for operating said register including driving racks and driven pinions, coin-actuated slides carrying said racks, a reciprocating frame carrying plungers to drive said racks by means of coins, and means carried by said frame for replacing said racks to normal positions.

47. In a coin counting machine, a register, a series of graduated racks and pinions for actuating said register one step or a plurality of steps, and a reciprocating frame carrying plungers for actuating said racks by means of coins, the number of steps being determined by the coins in the paths of said plungers.

48. In a coin counting machine, a register, a series of racks and pinions for actuating said register, and a reciprocating frame carrying a series of plungers for actuating said racks by means of coins whereby said register is actuated a step or a plurality of steps at each forward movement of said frame in accordance with the presence or absence of coins lying in the paths of said plungers.

49. In a coin counting machine, a register, a series of graduated racks and pinions, and a reciprocating frame carrying a series of plungers adapted to engage said racks for actuating said register by means of coins.

50. In a coin counting machine, a register, a series of graduated racks and pinions for actuating said register, and a reciprocating frame carrying a series of graduated plungers for driving said racks by means of coins to be registered.

51. In a coin counting machine, a register, a series of graduated racks and pinions for actuating said register, a series of actuating plungers moving simultaneously, and a series of slides lying in the paths of said plungers and carrying said racks.

52. In a coin counting machine, a register, a series of graduated racks and pinions operatively connected with said register, a reciprocating frame carrying plungers, and a series of coin-actuated slides lying in the paths of said plungers and actuated thereby to drive said racks.

53. A counting machine having a register, a plurality of independently operative connections with said register, and a reciprocating frame actuated by said machine and adapted to actuate any one or all of said connections during each stroke of said frame.

In testimony whereof, I set my hand in the presence of two witnesses, this 1st day of June, 1908.

BERTRAM FORREST BREWSTER.

Witnesses:
A. L. JACKSON,
J. W. STITT.